J. S. YOAST.
COMBINATION FENDER AND BUMPER DEVICE.
APPLICATION FILED DEC. 18, 1911.
1,060,395.
Patented Apr. 29, 1913.
2 SHEETS—SHEET 1.
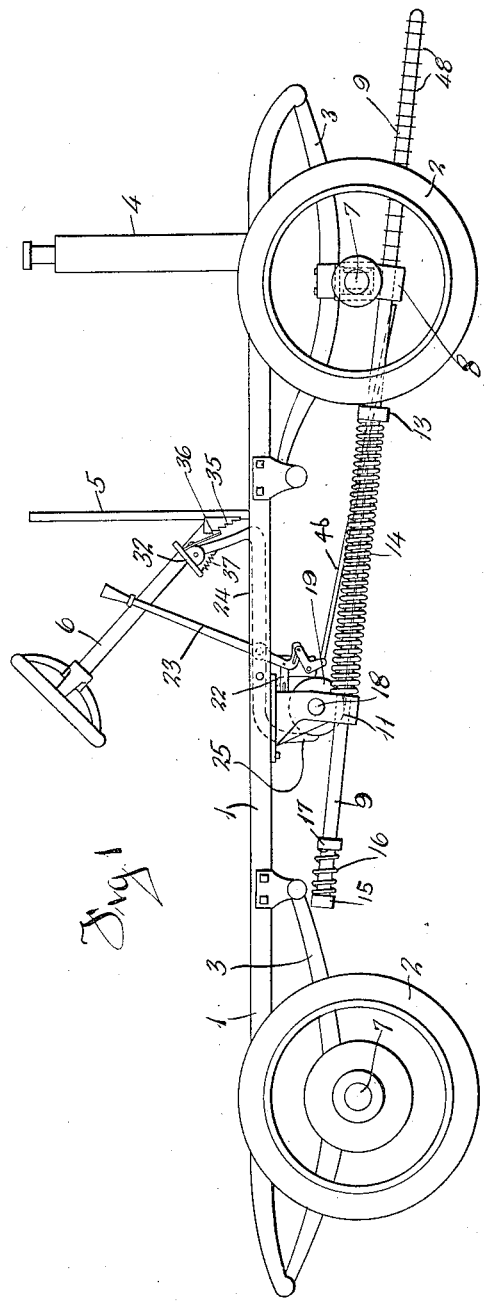
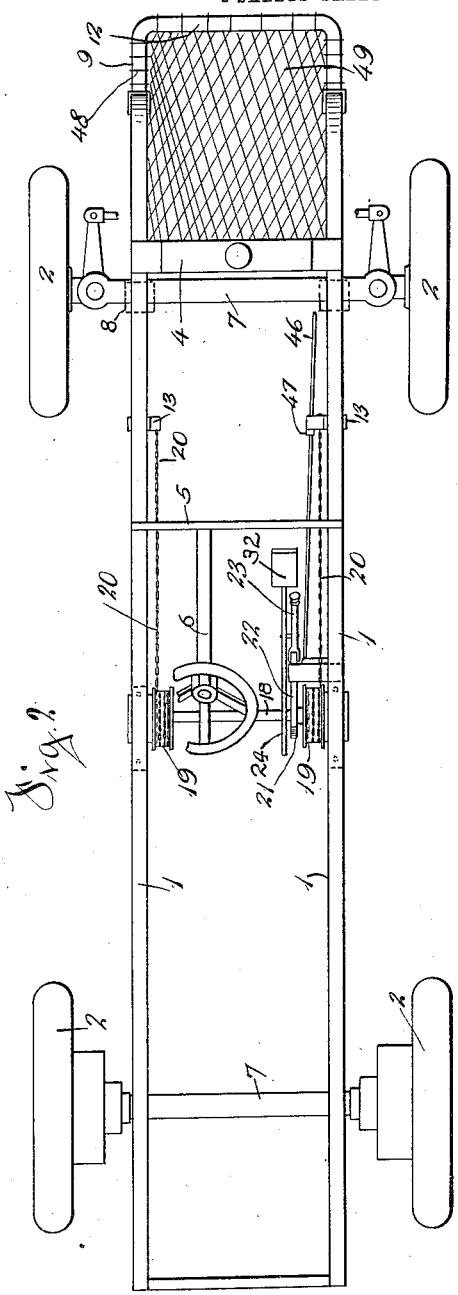
Witnesses
Oliver J. Forman
Goldie Gordon
Inventor
James S. Yoast
By
James N. Ramsey
Attorney

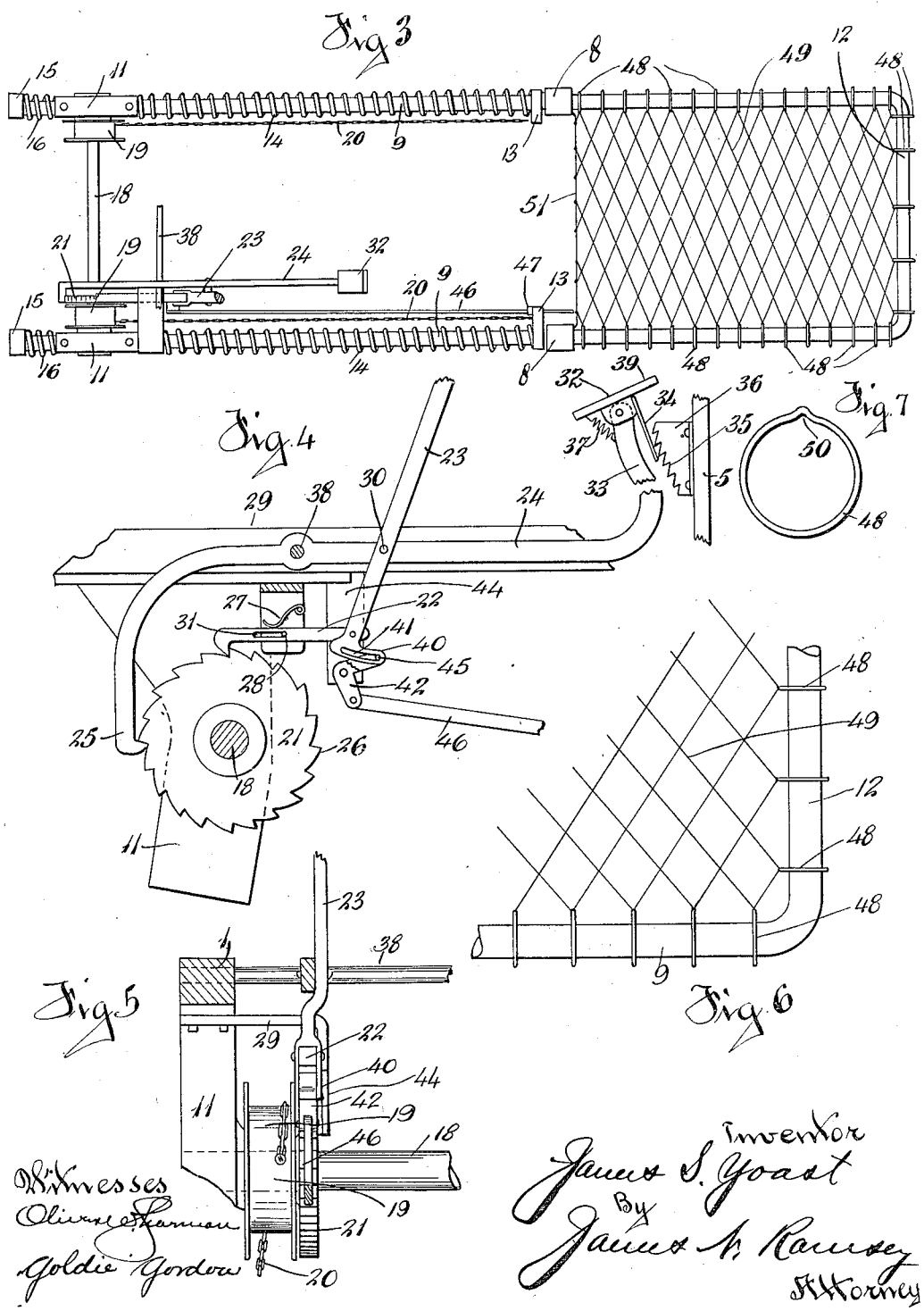

UNITED STATES PATENT OFFICE.

JAMES S. YOAST, OF CINCINNATI, OHIO.

COMBINATION FENDER AND BUMPER DEVICE.

1,060,395.  Specification of Letters Patent.  Patented Apr. 29, 1913.

Application filed December 18, 1911. Serial No. 666,370.

*To all whom it may concern:*

Be it known that I, JAMES S. YOAST, a citizen of the United States, residing at Cincinnati, in the county of Hamilton and State of Ohio, have invented a Combination Fender and Bumper Device, of which the following is a specification.

My invention relates to a combination fender and automatic releasing resistance bumper which is especially adapted to be applied to automobiles.

The object of my invention is to provide a fender for automobiles which can be readily attached, the fender also to be used as a bumper or protecting means for the automobile, and means whereby the fender is held back against the strong pressure of springs and automatically released and forced forward when said fender comes into contact with an obstruction with sufficient force to trip the releasing means, thereby lessening the liability of damaging the valuable mechanism of the automobile and forming a life saving device for same.

A further object of my invention is to produce a fender of the character described which can be released and operated by the operator of the machine, and which can also be released automatically.

My invention consists broadly of a fender, the sides of which extend backwardly a considerable distance under the frames and are suspended in suitable brackets mounted on the frame of the machine, said fender being adapted to slide longitudinally in said brackets, compression springs mounted on said sides of the fender adapted to force the fender to its outermost position, a buffer spring at the rear of said sides adapted to act as a cushion when said fender reaches its outermost position, means mounted on said machine for drawing said fender to its retracted position, means on said car whereby said fender may be released and automatic releasing mechanism for releasing the fender when it comes in reasonably hard contact with an obstruction.

My invention consists more specifically in a fender having side rods, a suitable mesh on the front of said fender to act as a basket, brackets for said rods mounted on the frame of the machine to which the device is attached, a collar on each side rod, compression springs between said collar and the rear brackets of said side rods, buffer springs at the end of said side rods adapted to engage the rear brackets when the fender is discharged or released, a shaft rotatably mounted in said rear brackets, sheaves tightly mounted on said shaft, chains fastened to said collars on the side rods of the fender and connected at their rear ends to the sheaves, a ratchet wheel mounted on said shaft, a hand lever pivoted to a foot lever mounted on said machine, a pawl connected at the lower end of said hand lever and adapted to engage the ratchet wheel, said hand lever when operated on its pivot being adapted to wind said chains upon said sheaves by rotating the ratchet wheel, a foot lever adapted to engage the ratchet wheel at one end and pivoted to the frame of said machine and means whereby said foot lever when being released from said ratchet wheel also releases said pawl from said ratchet wheel, a rod connected at the rear end to a bell crank lever which is suitably pivoted to a bracket on the frame of said machine for the purpose of forming an automatic release for said pawl and foot lever.

In the accompanying drawings, which serve to illustrate the invention: Figure 1 is a side elevational view of the chassis of an automobile equipped with my invention, showing the bumper in retracted position; Fig. 2 is a plan view of same; Fig. 3 is a plan view of my invention detached; Fig. 4 is an enlarged detail view showing the winding and tripping mechanism in elevation; Fig. 5 is a front elevational view of the mechanism shown in Fig. 4; Fig. 6 is a fragmentary detail view showing how the mesh is fastened to the framework of the fender by means of rings; and Fig. 7 is a detail view of one of the rings by means of which the mesh is attached to the frame.

Referring more particularly to the drawings, 1 illustrates the skeleton framework of an automobile and 2 the wheels thereof. The frame 1 is mounted in the usual manner by means of springs 3 and carries the radiator 4, the dash 5 and the steering column 6. Mounted on the front axle 7 I provide brackets 8 in which the side rods 9 of the fender 10 are suitably mounted and which allow longitudinal movement of said side rods. Brackets 11 are provided on the frame near the center thereof in which the side rods 9 are also suitably mounted. The fender 10 consists of the side rods 9 and a front engaging or bumper rod 12. The side rods 9 are provided with stationary collars 13 against which compression springs 14 are adapted to bear. The compression springs 14 are disposed between the collars 13 and the brackets 11 thereby tending to force the collars 13 and side rods 9 to the front of the vehicle or framework 1. At the ends of said side rods, I provide shoulders 15 against each of which a buffer spring 16 is adapted to bear. Collars 17 are provided and are loosely mounted on said side rods and form bearing surfaces for the rear ends of the buffer springs 16. The buffer springs 16 are preferably fastened to said collars, thus when the compression springs 14 force the side rods 9 to the fore the collars 17 engage the brackets 11 and the springs 16 form a cushion to take up the shock which would occur due to the strength of the compression springs 14.

Mounted in the brackets 11 is a shaft 18 which carries sheaves 19 tightly mounted thereon to which chains 20 are attached. The chains 20 at their front ends are fastened to the collars 13 on the side rods 9; thus when the shaft 18 is rotated clockwise it tends to wind up the chains 20 on the sheaves 19. A ratchet wheel 21 is tightly mounted on the shaft 18 which is engageable by a pawl 22 pivotally connected to the end of a hand lever 23. A foot lever is pivoted at 38 to the frame 1 of the machine and has a downwardly extending arm 25 at the rear thereof which is adapted to engage the teeth 26 of the ratchet wheel 21. The hand lever 23 is pivoted to the foot lever 24 and is adapted to operate to and fro in a line parallel with the direction of the machine. The pawl 22 at the end of said hand lever 23 is spring pressed by means of a spring 27 and is fulcrumed upon a pin 28 on the bracket 29 which is suitably fastened to the frame of the machine. Thus when the upper end of the hand lever 23 is moved forward on its pivot 30, the pawl 22 being mounted below the pivot 30, is moved backwardly, the pin 28 moving along the slot 31 in the pawl 22, thus operating the ratchet wheel. The foot lever 24 is provided with a foot tread 32 which may be pivoted on the end of the upwardly extending portion 33 of the foot lever 24. The pawl 34 is fastened to said foot tread and is adapted to engage a series of teeth 35 on a tooth-plate 36 mounted on the dash 5 of the machine. A tension spring 37 holds said pawl 34 into engagement with said tooth-plate 36. Thus when the upper end of said foot lever is forced downwardly a slight distance on its pivot 38 just enough to release the extension 25 from engagement with the teeth 26 of the ratchet wheel 21, the hand lever 23 is also lowered with said foot lever 24 and tilts the pawl 22 upon its fulcrum 28 so that it disengages the teeth 26 also. Then when the foot pressure is placed upon the top end 39 of the tread 32, the pawl 34 is released from the teeth 35 thereby allowing the foot lever 24 to assume its normal position. The spring 27 may be made strong enough to force said hand lever 23 upwardly, thereby raising the foot lever 24. Now when the fender is drawn back or retracted, I provide means for tripping the mechanism which holds the ratchet wheel 21 as follows: On the end of the hand lever 23 I provide a segment 40 with a slot 41 therein. A bell crank lever 42 is pivoted to a bracket 44 which is mounted on the frame 1 of the machine. The bell crank lever 42 is provided with a pin 45 which slides in the slot 41 of the segment 40. The rear end of the bell crank lever is fastened to a rod 46 which extends through one of the collars 13, as best shown in Fig. 2. This rod is provided with a collar 47 tightly mounted thereon which forms a bearing or contact for the collar 13. Thus when the fender is drawn back, any further movement, as that which would be created by the bumper rod 12 being bumped severely, immediately moves the bell crank lever 42, through the agency of the rod 46 and the stationary collar 47 mounted thereon, thereby moving the hand lever 23 downwardly and at the same time moving the foot lever 24 and allowing the ratchet wheel 21 and the sheaves 19 to unwind.

It is evident that by using my device, an automobile is greatly protected inasmuch as the compression springs 14 can be made powerful enough to overcome the momentum of the machine when it has come into contact with an obstruction, as for instance, if the bumper rod 12 comes into contact with an obstruction the fender mechanism is immediately released and the pressure of the springs 14 is allowed to be applied to offer an added resistance to the machine and thus protect the same.

My device can also readily be applied to any movable vehicle.

The basket portion of the fender is constructed by placing rings 48 on the frame of the fender and threading cord or wire, as may be desired, from one ring to the other, forming a mesh 49. The rings may be provided with an offset or recess 50 to hold the cord or mesh in place. Thus when the fender is drawn to its innermost position the rings will slide along the frame or side rods 9 of the fender and fold or collapse, the rear cord 51 of the mesh being fastened to the bearings 8 in order to prevent the rings 48 from moving with the side rods 9. However, any type of fender basket can be employed.

Modifications of my invention may be made without departing from its spirit or scope and I do not wish to be confined to the exact details shown, but

What I claim as new and desire to secure by Letters Patent is:

1. The combination of a chassis with forward and rear brackets mounted on the under side thereof, a fender having side rods slidably mounted in said brackets, compression springs tending to force said fender to its outermost position, buffer springs disposed between said rear brackets and the rear end of said side rods adapted to form a buffer for said fender when it reaches its foremost position, a shaft rotatably mounted in said rear brackets, mechanism on said shaft for moving said fender to its normal retracted position and means for automatically and manually releasing said mechanism to allow said fender to assume its foremost position.

2. The combination of a chassis with brackets mounted on the under side thereof, a fender having side rods slidably mounted in the brackets, means whereby said fender is forced to its outermost position, mechanism for holding it in its normal retracted position, and manually and automatically operated means for tripping said mechanism when said fender is to be moved to the rear beyond its normal retracted position, substantially as and for the purposes set forth.

3. The combination of a chassis with brackets mounted thereon, a fender having side rods, said side rods being slidably mounted in said brackets and adapted to extend beyond the front of the chassis to form a bumper, compression springs tending to force said fender to its outermost position relative to said brackets, mechanism mounted on the chassis for drawing said fender to its normal retracted position, a stationary collar on one of said side rods, a ratchet wheel, a pivotally mounted pawl engaging said ratchet wheel and having a foot tread connected thereto, and a rod pivotally connected to said pawl and having a collar thereon adapted to engage said stationary collar to automatically release said fender, substantially as set forth and for the purposes specified.

JAMES S. YOAST.

Witnesses:
 JAMES N. RAMSEY,
 GOLDIE GORDON.

Copies of this patent may be obtained for five cents each, by addressing the "Commissioner of Patents, Washington, D. C."